(12) United States Patent
Kuroda et al.

(10) Patent No.: US 8,257,813 B2
(45) Date of Patent: Sep. 4, 2012

(54) INFORMATION RECORDING MEDIUM (75) Inventors: Kazuo Kuroda, Yokohama (JP); Eiji Muramatsu, Tokyo (JP); Toshihiko Takishita, Kai (JP)

(73) Assignee: Pioneer Corporation, Tokyo (JP)

( * ) Notice: Subject to any disclaimer, the term of this patent is extended or adjusted under 35 U.S.C. 154(b) by 411 days.

(21) Appl. No.: 12/532,712

(22) PCT Filed: Mar. 28, 2007

(86) PCT No.: PCT/JP2007/056694
§ 371 (c)(1),
(2), (4) Date: Nov. 30, 2009

(87) PCT Pub. No.: WO2008/120324
PCT Pub. Date: Oct. 9, 2008

(65) Prior Publication Data
US 2010/0119762 A1  May 13, 2010

(51) Int. Cl.
*B32B 3/02* (2006.01)
(52) U.S. Cl. .................. 428/64.1; 428/64.4; 430/270.11
(58) Field of Classification Search .................. 428/64.4; 430/270.11
See application file for complete search history.

(56) References Cited

U.S. PATENT DOCUMENTS

| | | |
|---|---|---|
| 2005/0243338 A1 | 11/2005 | McClellan |
| 2006/0122058 A1 | 6/2006 | Van Brocklin et al. |
| 2006/0151605 A1 | 7/2006 | Miyoshi et al. |
| 2006/0209381 A1 | 9/2006 | Uchida |
| 2007/0031631 A1* | 2/2007 | Lundstrom et al. .......... 428/64.1 |

FOREIGN PATENT DOCUMENTS

| | | |
|---|---|---|
| JP | 2004-279680 | 10/2004 |
| JP | 2005-196917 | 7/2005 |
| JP | 2005-339642 | 12/2005 |
| JP | 2006-134424 | 5/2006 |
| WO | 2005/102715 | 11/2005 |

OTHER PUBLICATIONS

European Search Report—EP 07 74 0132—Nov. 7, 2011.
International Search Report, PCT/JP2007/056694, Jul. 17, 2007.

* cited by examiner

*Primary Examiner* — Elizabeth Mulvaney
(74) *Attorney, Agent, or Firm* — Young & Thompson

(57) ABSTRACT

An information recording medium comprising a substrate (1), a recording layer (2) formed on the substrate in order to record information, a color filter (4) formed on the substrate, and a thermal reflectance variation layer (3) formed on the substrate in order to vary light reflectance by heat incident to irradiation of light and to reflect visible light entering from one side of the substrate through a color filter. High precision color writing or color label writing can be carried out on an information recording medium such as DVD and BD where a label can be written on the surface by irradiating light.

2 Claims, 6 Drawing Sheets

INFORMATION RECORDING MEDIUM

TECHNICAL FIELD

The present invention relates to an information recording medium such as an optical disc, like a DVD, a BD (Blue ray Disc), or the like, in which a label can be drawn on its surface by light irradiation.

BACKGROUND ART

As this type of information recording medium, there is an information recording medium that is constructed such that a letter or character indicating content to be recorded, such as a title, is drawn when recording is performed on an information recording medium such as an optical disc, e.g. when digital television broadcasts are recorded or when a DVD is copied. For example, there has been suggested a technology in which a letter or character indicating information content to be recorded is drawn by the irradiation of a recording laser in an area adjacent to a data area in which information is to be recorded (refer to a patent document 1).
Patent Document 1: Japanese Patent Application Laid Open No. 2005-196917

DISCLOSURE OF INVENTION

Subject to be Solved by the Invention

According to the various label technologies associated with the aforementioned background art, a letter or character which is a simple line can be drawn in black and white; however, there is such a technical problem that it is extremely hard or practically impossible to respond to color drawing of a color letter or character, a color image, or the like, in which alignment by a pixel unit and positioning in label drawing are remarkably complicated and sophisticated.

In view of the aforementioned problem, it is therefore an object of the present invention to provide an information recording medium which allows color drawing or label drawing in color to be performed highly accurately.
Means for Solving the Subject The above object of the present invention can be achieved by a first information recording medium provided with: a substrate; a recording layer which is laminated on the substrate and in which information can be recorded; a color filter which is laminated over the substrate; and a heat reflectance change layer which is laminated over the substrate, in which optical reflectance can be changed by heat associated with light irradiation, and which reflects visible light that enters from one surface side of the substrate through the color filter.

According to the first information recording medium of the present invention, in its recording operation, typically, information is optically recorded by the irradiation of a recording laser (i.e. a laser with a power set in advance as a power suitable for the recording) or the like, into the recording layer laminated on the substrate. Moreover, in its reproduction operation, typically, the information recorded in this manner is optically reproduced by the irradiation of a reproduction laser (i.e. a laser with a power set in advance as a power suitable for the reproduction) or the like. Such an information recording medium is typically an optical disc such as a DVD, a BD, or the like; however, it is not limited to an optically recordable medium but may be a medium on which recording is performed by using other physical phenomena, such as electric and electromagnetic phenomena. The shape of the substrate is not limited to the disc shape but may be a card shape or the like.

In the present invention, in particular, the color filter is laminated on the substrate, and the heat reflectance change layer is further laminated on the substrate. Here, the "heat reflectance change layer" is a thin film formed of various existing materials in which the optical reflectance can be changed by the heat associated with the light irradiation, such as irradiation of a laser beam in a DVD recorder. Such a heat reflectance change layer is laminated in a position in which the visible light that enters from the one surface side, e.g. a label surface side of the substrate, of the substrate is reflected through the color filter.

Incidentally, the "recording layer" of the present invention is typically laminated on the other surface side of the substrate (i.e. on the opposite side to the label surface which is one example of the one surface). The recording layer may be laminated on the one surface side (i.e. the label surface side). In contrast, the "one surface" of the present invention typically corresponds to the label surface which is located opposite to a recording surface on a recordable side. The "one surface" may be the surface on the recordable side; namely, the recording can be performed on the recording layer only from the label surface side, or also from the label surface side. In other words, the one surface may be the recording surface.

Therefore, when desired information about the information to be recorded into the recording layer is drawn on the one surface as a letter, character, or image (hereinafter, referred to as "label drawing", as occasion demands), light such as a drawing laser beam (i.e. a laser with a power set in advance as a power suitable for the drawing) is applied to the heat reflectance change layer, and the heat associated with the light irradiation changes the optical reflectance. Incidentally, the drawing laser beam may be also used as a recording laser beam. Here, a portion in which the optical reflectance is high in an initial state is changed to a portion in which the optical reflectance is low, due to the light irradiation. Alternatively, a portion in which the optical reflectance is low in the initial state is changed to a portion in which the optical reflectance is high, due to the light irradiation. Then, in the portion in which the optical reflectance is high or becomes high, the amount of the visible light reflected by the heat reflectance change layer on the one surface side through the color filter is relatively large, and in the portion in which the optical reflectance is low or becomes low, the amount of the visible light reflected by the heat reflectance change layer on the one surface side through the color filter is relatively small. Therefore, the color drawing can be performed if the light irradiation is performed with the light modulated in each microdomain (hereinafter referred to as a "cell", as occasion demands), which is a color pixel unit in the color filter, in response to the letter, character, or image to be written. For example, if the color filter is formed such that there are three micro color areas of RGB (Red, Green, Blue) in each cell, it is possible to express any color based on the light's three primary colors, with the cell as the pixel unit.

Incidentally, the arrangement order of the substrate, the recording layer, the color filter, and the heat reflectance change layer is arbitrary as long as the heat reflectance change layer reflects the visible light that enters from the one surface side of the substrate through the color filter, and there can be many combinations. Moreover, it is also arbitrary to place or form another layer such as a protective layer and a planarizing layer, between or outside the layers.

On the other hand, typically, a direction of applying the light associated with the light irradiation in the label drawing is also from the other surface side (i.e. on the same side on which the recording laser beam is applied when the recording is performed on the recording layer); however, it may be from the one surface side (i.e. the label surface side or the opposite side to the irradiation of the recording laser beam when the recording is performed on the recording layer) in the case of a lamination structure in which the light irradiation can be performed on the heat reflectance change layer. If the drawing laser is also used as the recording layer, it is easy to apply the laser from the other surface side.

Consequently, according to the first information recording medium of the present invention, the color drawing of the label can be performed in a relatively simple process.

In one aspect of the first information recording medium of the present invention, the heat reflectance change layer and the color filter are laminated in this order on the one surface side of the substrate, and the information recording medium is further provided with a protective film laminated on the color filter.

According to this aspect, the color filter is held between the heat reflectance change layer and the protective layer, so that the chemical, physical, or mechanical resistance of the color filter is remarkably high both before and after the drawing. Thus, it is possible to effectively prevent that a coloring performance degrades in the drawing, that a color spot is generated, and that a color letter, character, or image after the drawing disappears or is hardly seen with use or due to time degradation.

The above object of the present invention can be achieved by a second information recording medium provided with: a substrate; a recording layer which is laminated on the substrate and in which information can be recorded; a color filter which is laminated over the substrate; a heat transmittance change layer which is laminated over the substrate and in which optical transmittance can be changed by heat associated with light irradiation; and a reflective layer which is laminated over the substrate and which reflects visible light that enters from one surface side of the substrate through the heat transmittance change layer and the color filter.

According to the second information recording medium of the present invention, in its recording operation, as in the aforementioned first information recording medium, information is optically recorded into the recording layer laminated on the substrate. Moreover, in its reproduction operation, the information recorded in this manner is optically reproduced.

In the present invention, in particular, the color filter is laminated on the substrate, and the heat transmittance change layer and the reflective layer are further laminated on the substrate. Here, the "heat transmittance change layer" is a thin film formed of various existing materials in which the optical transmittance can be changed by the heat associated with the light irradiation, such as irradiation of a laser beam in a DVD recorder. Moreover, the reflective layer, which establishes a mirror surface of Aluminum or the like, is laminated in a position in which the visible light that enters from the one surface side of the substrate, e.g. the label surface side of the substrate, is reflected through the heat transmittance change layer and the color filter.

Incidentally, the "recording layer" of the present invention is typically laminated on the other surface side of the substrate (i.e. on the opposite side to the label surface which is one example of the one surface). The recording layer may be laminated on the one surface side (i.e. the label surface side). In contrast, the "one surface" of the present invention typically corresponds to the label surface which is located opposite to a recording surface on a recordable side. The "one surface" may be the surface on the recordable side; namely, the recording can be performed on the recording layer only from the label surface side, or also from the label surface side. In other words, the one surface may be the recording surface.

Therefore, in the label drawing, light such as a drawing laser beam is applied to the heat transmittance change layer, and the heat associated with the light irradiation changes the optical transmittance. Incidentally, the drawing laser beam may be also used as a recording laser beam. Here, a portion in which the optical transmittance is high in an initial state is changed to a portion in which the optical transmittance is low, due to the light irradiation. Alternatively, a portion in which the optical transmittance is low in the initial state is changed to a portion in which the optical transmittance is high, due to the light irradiation. Then, in the portion in which the optical transmittance is high or becomes high, the amount of the visible light reflected by the reflective layer on the one surface side through the color filter is relatively large, and in the portion in which the optical transmittance is low or becomes low, the amount of the visible light reflected by the reflective layer on the one surface side through the color filter is relatively small. Therefore, the color drawing can be performed if the light irradiation is performed with the light modulated in each cell in the color filter, in response to the letter, character, or image to be written.

Incidentally, the arrangement order of the substrate, the recording layer, the color filter, the heat transmittance change layer, and the reflective layer is arbitrary as long as the reflective layer reflects the visible light that enters from the one surface side of the substrate through the heat transmittance change layer and the color filter, and there can be many combinations. Moreover, it is also arbitrary to place or form another layer such as a protective layer and a planarizing layer, between or outside the layers. In addition, in the present invention, the expression that "reflects . . . through the heat transmittance change layer and the color filter" in effect means that any order of the heat transmittance change layer and the color filter will do.

On the other hand, typically, a direction of applying the light associated with the light irradiation in the label drawing is also from the other surface side; however, it may be from the one surface side in the case of a lamination structure in which the light irradiation can be performed on the heat transmittance change layer.

Consequently, according to the second information recording medium of the present invention, the color drawing of the label can be performed in a relatively simple process.

In one aspect of the second information recording medium of the present invention, the reflective layer, the color filter, and the heat transmittance change layer are laminated in this order on the one surface side of the substrate, and the information recording medium is further provided with a protective film laminated on the heat transmittance change layer.

According to this aspect, the color filter is held between the reflective layer and the protective layer, so that the chemical, physical, or mechanical resistance of the color filter is remarkably high both before and after the drawing. Thus, it is possible to effectively prevent that a coloring performance degrades in the drawing, that a color spot is generated, and that a color letter, character, or image after the drawing disappears or is hardly seen with use or due to time degradation.

In another aspect of the first or second information recording medium of the present invention, the color filter comprises a plurality of cells divided in color, and one or a plurality of addresses are assigned to each of the plurality of cells.

According to this aspect, by referring to the address in the label drawing, it is possible to accurately perform the color drawing by the cell unit.

In another aspect of the first or second information recording medium of the present invention, the substrate is in a disc shape, and a guide track for guiding the light irradiation is formed in a spiral manner or a concentric manner on the substrate.

According to this aspect, the label drawing is performed while the light irradiation is guided by the guide track, so that it is possible to accurately perform the light irradiation on the heat reflectance change layer or the heat transmittance change film, formed on the substrate in the disc shape. Thus, it is possible to accurately perform the label drawing.

Incidentally, the substrate is not necessarily in the disc shape but may be, e.g., in a planar shape or the like. In addition, the guide track is not necessarily in the spiral shape or the concentric shape but may be in a linear shape or the like.

In the aspect in which the guide track is formed, as described above, the color filter may be provided with a plurality of cells divided in color, and an address pit indicating one or a plurality of addresses assigned to each of the plurality of cells may be formed on the guide track in a CLV (Constant Linear Velocity) method.

By virtue of such construction, due to the CLV method, even if the light irradiation is performed in an environment in which a rotational speed varies depending on a radial position in the label drawing, it is possible to accurately perform the light irradiation on the heat reflectance change layer or the heat transmittance change film, formed on the substrate in the disc shape, by referring to the address pit. Incidentally, the address pit is formed as, e.g., an embossed pit. As described above, even in the CLV method, it is possible to accurately perform the label drawing.

In the aspect in which the guide track is formed, as described above, the color filter may be disposed such that the same color is placed in the spiral manner or the concentric manner.

By virtue of such construction, when the light irradiation is performed while the disc-shaped substrate is rotated, even if timing of modulating the light irradiation is off to a greater or lesser degree with respect to the rotational motion, or even if alignment is shifted by 180 degrees, it is merely the shift in the same color, which results in drawing extremely close to the intended drawing. In other words, even without strict timing control and alignment of color cells or the like, it is possible to perform the desired color drawing, relatively easily, which is extremely useful in practice.

In the aspect in which the guide track is formed, as described above, the color filter may be provided with a plurality of cells divided in color, one or a plurality of addresses may be assigned to each of the plurality of cells, and the color filter and the guide track may be formed such that an end of the cell corresponds to a position in a radial direction of the guide track.

By virtue of such construction, by referring to the address in the label drawing, it is possible to accurately perform the color drawing by the cell unit. In particular, since the end of the cell corresponds to the position in the radial direction of the guide track, it is possible to effectively prevent the light irradiation from being mistakenly performed over the end of the cell. As a result, it is possible to perform the color drawing, extremely accurately.

In another aspect of the first or second information recording medium of the present invention, the substrate is in a disc shape, a guide track for guiding the light irradiation is formed in a spiral manner or a concentric manner on the substrate, the color filter comprises a plurality of cells divided in color, one or a plurality of addresses are assigned to each of the plurality of cells, and relation information indicating a relation between an end of the cell and a position in a radial direction of the guide track is recorded in the recording layer or in another recording layer or in a predetermined type of recording method.

According to this aspect, by referring to the address in the label drawing, it is possible to accurately perform the color drawing by the cell unit. In particular, by referring to the relation information which indicates the relation between the end of the cell and the position in the radial direction of the guide track and which is described by a barcode or the like in addition to the address, it is possible to effectively prevent the light irradiation from being mistakenly performed over the end of the cell. As a result, it is possible to perform the color drawing, extremely accurately.

Incidentally, the relation information may be recorded in the same manner as the recording in the recording layer, and it may be read before the label drawing. Alternatively, the relation information may be recorded in another recording manner, and it may be read before the label drawing. This aspect is effective particularly when the position of the end of the cell does not correspond to the position in the radial direction of the guide track, with respect to the color filter and the guide track.

In this aspect, the color filter may be linearly placed.

By virtue of such construction, in particular, the relation between the disc-shaped substrate or the guide track and the end of the color filter is complicated, but the relation information described above can be used in the label drawing. Thus, it is possible to accurately perform the color drawing on the basis of the relation information.

As described above, the color filter may be linearly placed, regardless of the shape of the guide track. In this case, various arrangements can be adopted, such as delta arrangement, triangle arrangement, and stripe arrangement, which is practically useful.

In another aspect of the first or second information recording medium of the present invention, the color filter is formed by printing, and a guide track for guiding the light irradiation is formed on the substrate in a continuous, three-dimensional shape owned by the color filter.

According to this aspect, the color filter can be formed, relatively simply, by the printing technology. Moreover, the guide track can be relatively easily formed in the continuous, three-dimensional shape owned by the color filter formed by the printing technology. Thus, it is extremely useful in practice.

Incidentally, in addition to or instead of the color filter, the guide track may be formed by printing.

In another aspect of the first or second information recording medium of the present invention, a guide track for guiding the light irradiation is formed on the substrate, including a material which reflects light other than the visible light at higher optical reflectance or which absorbs the light at higher optical absorptance, in comparison with the visible light.

According to this aspect, by using the light other than the visible light or light including much of the light other than the visible light for the light irradiation in the label drawing, it is possible to make the heat associated with the light irradiation act on the heat reflectance change layer or the heat transmittance change layer, more effectively, by the light reflection or the light absorbance in the guide track. In other words, the label drawing can be performed with a relatively small energy loss. Moreover, the original function of the label drawing which is seen by the visible light is not impaired.

The operation and other advantages of the present invention will be become more apparent from the embodiments explained below.

As explained above in detail, according to the first information recording medium of the present invention, it is provided with the recording layer, the color filter, and the heat reflectance change layer, and according to the second information recording medium of the present invention, it is provided with the recording layer, the color filter, the heat transmittance change layer, and the reflective layer. Thus, it is possible to perform the color drawing, highly accurately.

DESCRIPTION OF REFERENCE CODES 1 substrate
2 recording layer
3 heat reflectance change film
4 color filter
5 protective film
41 reflective layer
42 heat transmittance change film
100 information recording medium

BEST MODE FOR CARRYING OUT THE INVENTION

Figure 1:
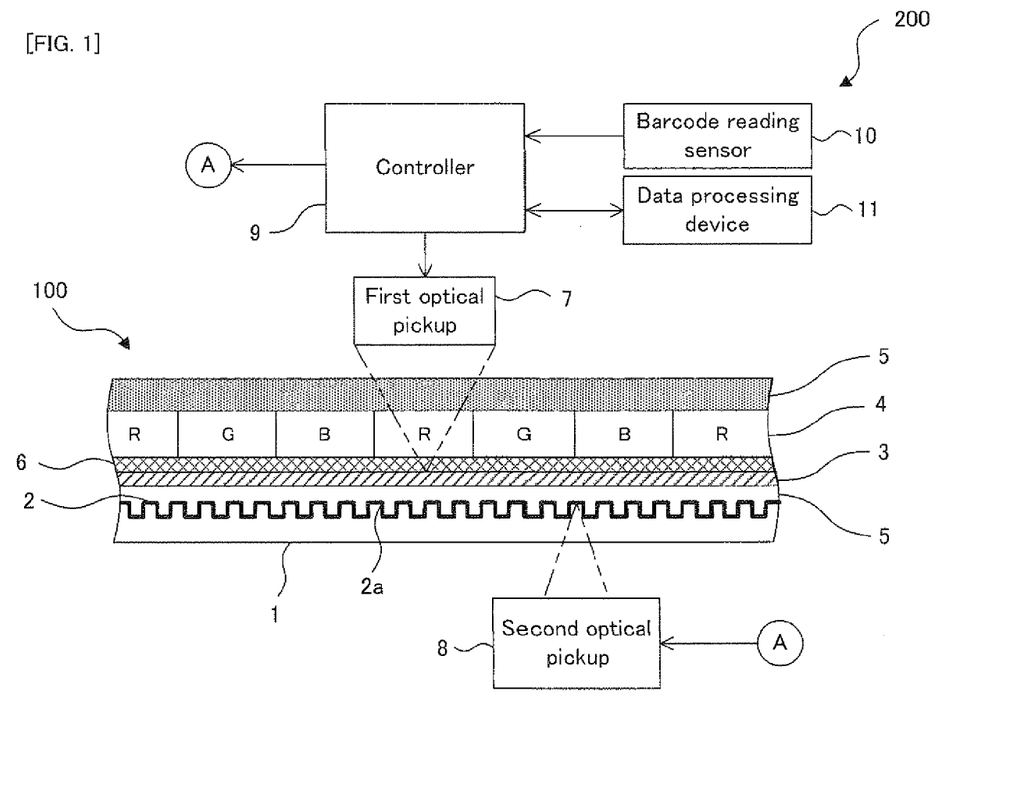
FIG. 1 is a schematic cross sectional view showing an enlarged cross section showing the laminated structure of an information recording medium in a first embodiment together with the outline of a recording apparatus.
Figure 2:
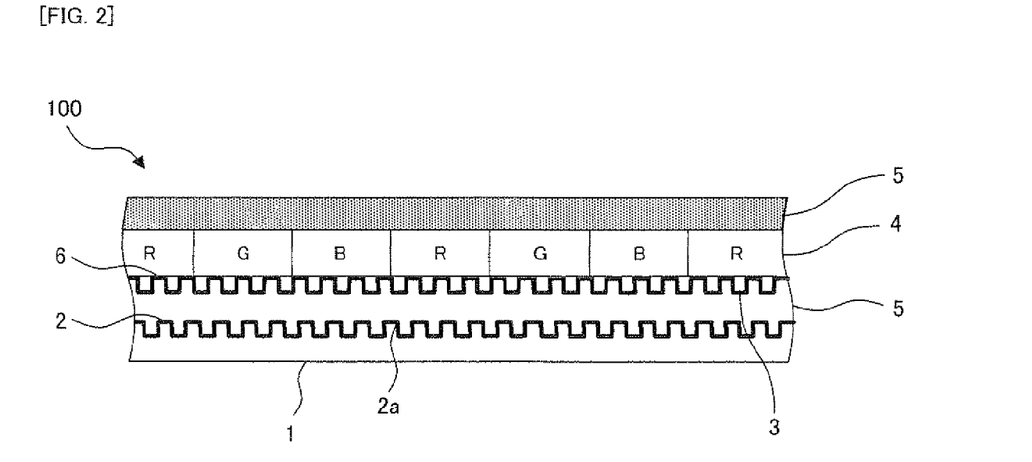
FIG. 2 is a schematic cross sectional view showing the laminated state of a heat reflectance change film and a guide track in the first embodiment.
Figure 3:
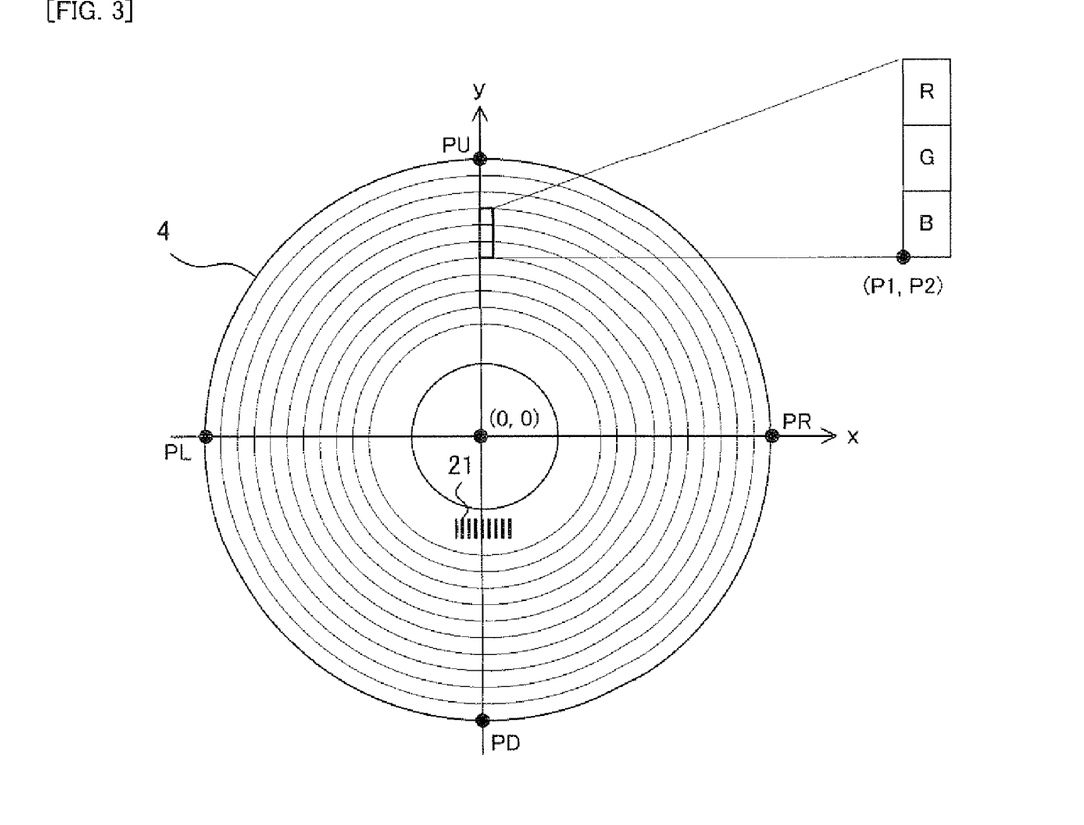
FIG. 3 is a schematic plan view showing the planar layout of a color filter in the first embodiment.

Hereinafter, embodiments of the present invention will be described with reference to the drawings.
<First Embodiment>
Firstly, with reference to FIG. 1 to FIG. 3, an information recording medium in a first embodiment will be explained. FIG. 1 shows the laminated structure of an information recording medium in the first embodiment. FIG. 2 shows the laminated state of a heat reflectance change film and a guide track in the first embodiment. FIG. 3 shows the planar layout of a color filter in the first embodiment.

In FIG. 1, an information recording medium 100 in the embodiment is, e.g., an optical disc, and it is provided mainly with a substrate 1, a recording layer 2, a heat reflectance change film 3, a guide track 6, a color filter 4, and protective films 5. The color filter 4 in the embodiment is continued to and unified with the guide track 6. In the information recording medium 100, information is recorded or reproduced by laser irradiation from optical pickups 7 and 8. In particular, in the information recording medium 100, data recording is performed by the irradiation of a recording laser, and label drawing is performed by the irradiation of a drawing laser. Incidentally, the recording laser and the drawing laser can be also shared.

The substrate 1 is formed, e.g., in a disc shape. One surface (i.e. an upper surface of the substrate 1 shown in FIG. 1) is a label surface on which a letter, a character, or an image can be drawn, and the other surface which is opposite to the label surface (i.e. a lower surface of the substrate 1 shown in FIG. 1) is a recording surface on a side in which information can be recorded.

The recording layer 2 is laminated on the label surface of the substrate 1. The recording layer 2 has grooves 2a formed on a surface on the side of the substrate 1. The data recording is performed by changing the recording layer 2 in quality by applying a laser beam with a power according to the record data while tracking the second optical pickup 8, disposed on the recording surface side of the substrate 1, with respect to the grooves 2a.

The heat reflectance change film 3 is laminated on the protective film 5 described later which is laminated on the recording layer 2. In the heat reflectance change film 3, optical reflectance is changed by heat associated with the light irradiation of the drawing laser. The heat reflectance change film 3 is heated by absorbing the drawing laser applied from the laser surface side of the substrate 1 through the color filter 4 and the guide track 6, in each microdomain corresponding to a spot of the drawing laser. Alternatively, the heat reflectance change film 3 is heated in each microdomain corresponding to the spot of the drawing laser due to the conductance of the heat generated by that the protective film 5, the color filter 4, the guide track 6, and the substrate 1 absorb the drawing laser beam. By this, the reflectance of the heat reflectance change film 3 is changed with a distribution according to the irradiation or non-irradiation of the drawing laser beam. As a result, in the heat reflectance change film 3, the amount of light reflected on the label surface side is increased in a portion in which the optical reflectance is high or becomes high, and the amount of light is reduced in a portion in which the optical reflectance is low or becomes low. In the embodiment, a laser suitable for heating is used for the drawing laser, such as a red laser, an infrared laser, and a far-infrared ray; however, it may be a blue laser or the like.

The guide track 6 is disposed on the heat reflectance change film 3, and tracks are formed concentrically. The guide track 6 accurately guides the light irradiation of the drawing laser to the heat reflectance change film 3. The guide track 6 has such a characteristic that it reflects or absorbs light other than visible light, i.e. the recording laser in the embodiment. Incidentally, the guide track 6 may be formed separately from the color filter 4. The color filter 4 is disposed on the guide track 6 and is formed of a plurality of color cells. Each of the color cells is provided with three micro color areas of RGB. Moreover, each of the color cells has one address assigned. An address pit indicating the address is recorded in the guide track 6 in a CLV method, e.g., as an embossed pit. Incidentally, in the embodiment, although one address is assigned to each of the color cells in the color filter 4, a plurality of addresses may be assigned. Moreover, the addresses may be assigned individually to the RGB color areas which constitute each color cell.

In FIG. 2, at an actual manufacturing step of the information recording medium 100, the heat reflectance change film 3 is deposited on the guide track 6. Therefore, as shown in FIG. 2, a film obtained by unifying the heat reflectance change film 3 and the guide track 6 is disposed on the surface on the substrate 1 side in the color filter 4.

The protective films 5 are to protect the color filter 4 from corrosion caused by external damage, moisture, and the like, and they are laminated on the recording layer 2 and the color filter 4.

A recording apparatus 200 is provided mainly with a first optical pickup 7, a second optical pickup 8, a controller 9, a barcode reading sensor 10, and a data processing device 11, and it performs data recording and label drawing on the information recording medium 100.

The controller 9 is connected to the first optical pickup 7, the second optical pickup 8, the barcode reading sensor 10, and the data processing device 11, and it controls each of those devices. The controller 9 controls the drive of the second optical pickup 8 and applies the recording laser from the recording surface side of the substrate 1, thereby performing the data recording on the recording layer 2. Moreover, the controller 9 controls the drive of the first optical pickup 7 and applies the drawing laser from the label surface side of the substrate 1, thereby performing the label drawing.

The barcode reading sensor 10 reads relative position information from a barcode 21 recorded on the information recording medium 100.

The data processing device 11 performs a predetermined data process on the basis of the relative position information read by the barcode reading sensor 10.

The label drawing is performed by making a heat reflectance change in each microdomain in the heat reflectance change film 3 by applying the drawing laser beam to the heat reflectance change film 3 while modulating the power of the drawing laser beam in accordance with a letter, a character, or an image to be drawn, with the tracking with respect to the guide track 6.

After the label drawing in the above manner, visible light (i.e. external light, natural light, or the like surrounding a viewer) reflected on the heat reflectance change film 3 is emitted toward the viewer through the color filter 4, by which a desired letter, character, or image which is label-drawn can be seen. Here, in particular, the label drawing allows the visible letter, character, or image to be formed on the label surface of the substrate 1, and the letter, character, or image is expressed in any color, with the color cell as a pixel unit.

In order to perform the label drawing in color, highly accurately, it is necessary to thermally apply the drawing laser beam while accurately positioning it on the basis of the address assigned to each color cell. In addition, in the manufacturing of the information recording medium 100, it is necessary to manufacture the information recording medium 100 such that a relative positional relation between the color filter 4 and the guide track 6 is accurate, and it is necessary to make the relation known so that the relation can be used in the label drawing. In the embodiment, in order to make the relation known, information indicating the relation is recorded as a barcode on the information recording medium 100, or the relation is set to a relation that can be specified from the guide track and the address.

Next, an explanation will be given on the structure of the color filter 4 and the positioning of the color filter 4 and the guide track 6. In the color filter 4, the positioning to the guide track 6 is performed in the manufacturing of the information recording medium 100.

In FIG. 3, the plurality of color cells are printed such that the color areas in the same color are arranged concentrically, i.e. such that the circumference is formed of only the color areas of R. The color filter 4 having the color cell arrangement is joined to the guide track 6 such that the end of each of the color cells corresponds to a position in the radial direction of the guide track 6, on the basis of the address. Specifically, the positioning associated with the relative positional relation is performed by adjusting the position of the color filter 4 with respect to the guide track 6 such that a point (P1, P2) indicating the end in X-Y coordinates corresponds to the edge of any of the concentric tracks with different circumferences of the guide track 6, at a color filter generation step in the manufacturing process of the information recording medium 100. Due to the positioning, if the end of each of the color cells corresponds to the position in the radial direction of the guide track 6, it is possible to prevent the light irradiation from being performed over the end in the subsequent irradiation of the laser beam by the first optical pickup 7, i.e. in the label drawing (refer to FIG. 1), thereby allowing highly accurate color drawing.

If the end of each of the color cells does not correspond to the position in the radial direction of the guide track 6 even when the aforementioned poisoning is performed, or if the positioning is performed such that the end of each of the color cells does not correspond to the position in the radial direction of the guide track 6, or if the positioning is performed with the least trouble to make them correspond to each other, the relative position information indicating the relative position between the color filter 4 and the guide track 6 is recorded, e.g., as the barcode 21 on the label surface. As the relative position information, for example, the amounts of shifts from predetermined positions of four points PU, PD, PL, and PR, which are at the same distance from the center (0, 0) of the color filter 4, are recorded.

In the label drawing, the barcode reading sensor 10 firstly reads the relative position information recorded in the barcode 21 and calculates the power and the address position of the irradiation of the drawing laser corresponding to the individual pixel data which constitutes the letter, character, or image to be drawn. The first optical pickup 7 performs the label drawing by performing the light irradiation of the drawing laser with the calculated power at the calculated address position. Then, the drawing laser can be applied to the color filter at the accurate position. As described above, by referring to the relative position information indicating the end of the color cell and the position in the radial direction of the guide track 6 in addition to the address assigned to the color filter 4, a color shift is prevented, thereby allowing extremely highly accurate color drawing.

Next, a process of generating the color filter 4 in the first embodiment will be explained with reference to FIG. 4.

(Color Filter Generation Process in First Embodiment)

Figure 4:
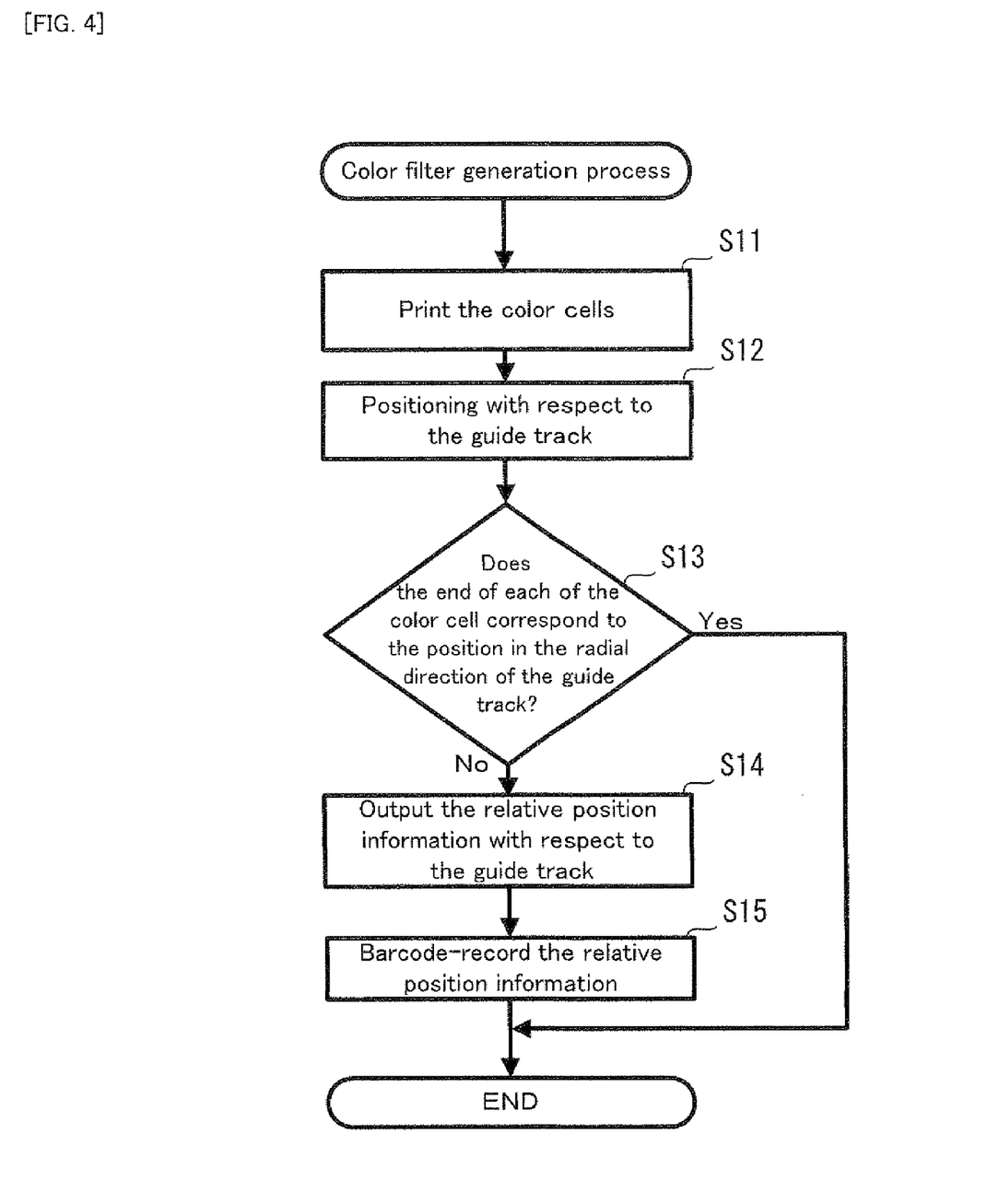
FIG. 4 is a flowchart showing a color filter generation process in the first embodiment.

FIG. 4 is a flowchart showing a process of generating the color filter 4 in the first embodiment.

Specifically, in FIG. 4, the control computer of a color filter generating apparatus controls a printer, which performs screen printing, offset printing, or the like using color dye, color resin, color ink, or the like, to print the color cells such that the color cells in the same color are arranged concentrically (step S11). Then, the positioning of the color filter 4 and the guide track 6 is performed (step S12). In this positioning, the position of the color filter 4 is adjusted with respect to the guide track 6 such that the end of each of the color cells corresponds to a position in the radial direction of the guide track 6. Due to the adjustment, if the end of each of the color cells corresponds to the position in the radial direction of the guide track 6 (step S13: Yes), the operation process is ended. On the other hand, if the end of each of the color cells does not correspond to the position in the radial direction of the guide track 6 even when the aforementioned adjustment is performed, or if the end of each of the color cells is intentionally prevented from corresponding to the position in the radial direction of the guide track 6 (the step S13: No), the relative position information about the color filter 4 and the guide track 6 is outputted (step S14). After that, the outputted relative position information is barcode-recorded (step S15), and the series of color filter generation process is ended.

Next, a label drawing process using the information recording medium 100 in the first embodiment will be explained with reference to FIG. 5.

(Label Drawing Process in First Embodiment)

Figure 5:
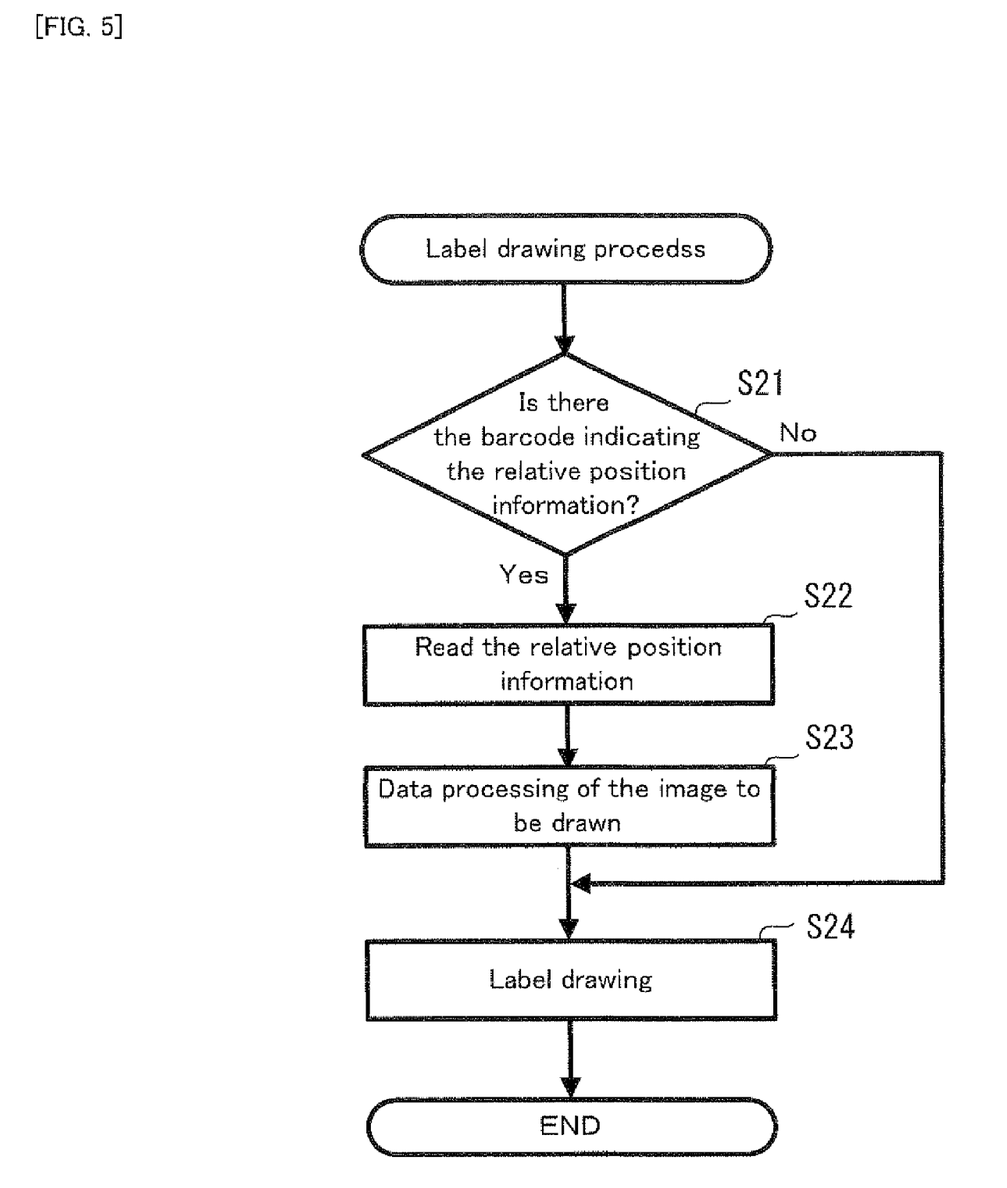
FIG. 5 is a flowchart showing a label drawing process in the first embodiment.

FIG. 5 is a flowchart showing the label drawing process of the information recording medium 100 provided with the color filter 4 in the first embodiment.

Specifically, in FIG. 5, firstly, it is judged by the controller 9 whether or not there is the barcode 21 indicating the relative position information on the label surface of the information recording medium 100 (step S21). Here, if there is no barcode 21 (the step S21: No), the drawing laser beam according to the image to be drawn is applied, and the heat reflectance change film 3 is heated or not heated by a cell unit in accordance with the modulation of the drawing laser, by which a color image is drawn on the label surface (step S24).

On the other hand, if there is the barcode 21 (the step S21: Yes), the relative position information is read from the barcode 21 by the barcode reading sensor 10 (step S22). Then, the image to be drawn is data-processed on the basis of the relative position information by the data processing device 11 (step S23). If the drawing laser beam according to the data-processed image is applied, the heat reflectance change film 3 is heated or not heated by the cell unit in accordance with the modulation of the drawing laser, by which the color image is drawn on the label surface (the step S24).

As described above, according to the first embodiment, it is provided with the heat reflectance change film 3, the color filter 4, and the guide track 6, and the positioning with respect to the color filter 4 is accurately performed on the basis of the address assigned to each of the color cells before the light irradiation by the drawing laser is performed by the color cell unit. By this, the accurate light irradiation by the pixel unit is performed to express colors, so that it is possible to perform the color drawing or the label drawing in color, highly accurately.

Figure 6:
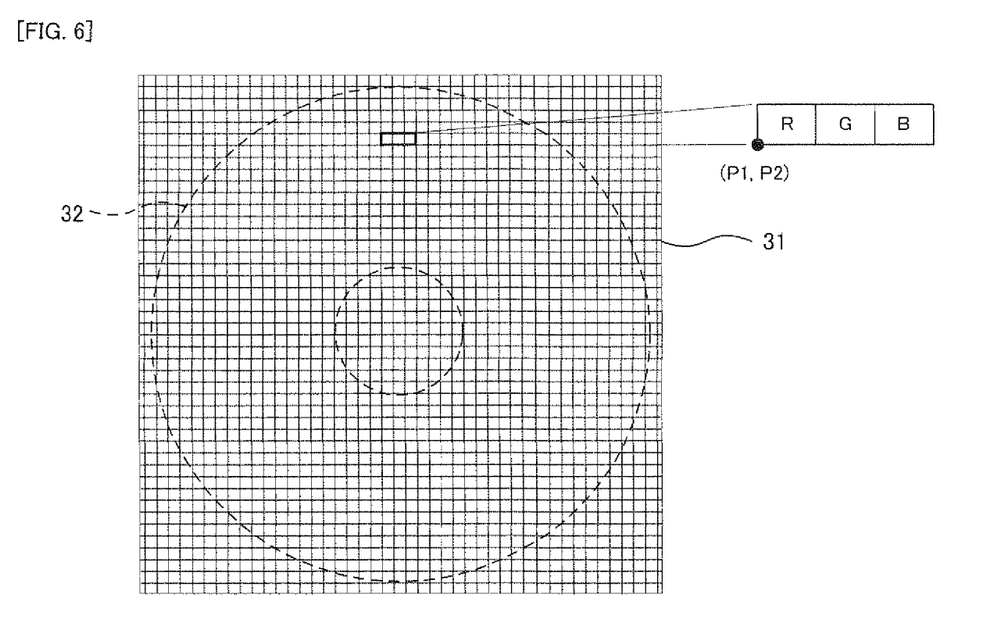
FIG. 6 is a schematic plan view showing a planar layout in a modified example of the color filter in the first embodiment.

Incidentally, according to the color filter 4 in the first embodiment, the plurality of color cells are printed such that the color areas in the same color are arranged concentrically; however, as shown in FIG. 6, the plurality of color cells may be printed linearly, regardless of the shape of a guide track 32. Even in this case, if the relative position information indicating the relative position of the color filter 4 and the guide track 6 is recorded in a barcode or the like, the color drawing is accurately performed with reference to this recorded barcode.

<Second Embodiment>

Figure 7:
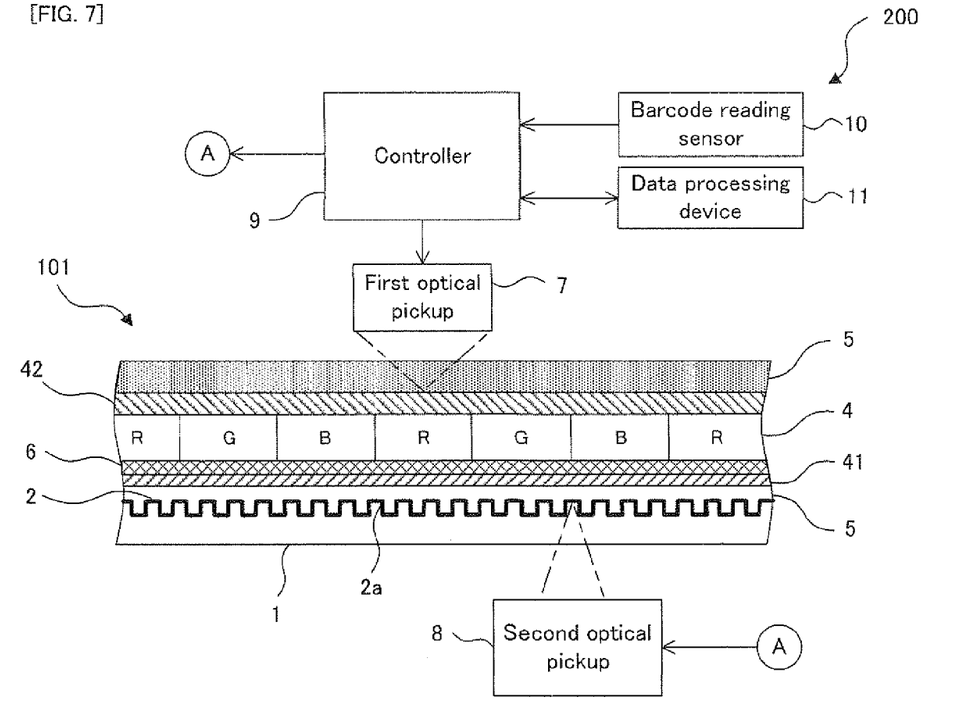
FIG. 7 is a schematic cross sectional view showing an enlarged cross section showing the laminated structure of an information recording medium in a second embodiment together with the outline of a recording apparatus.

Next, with reference to FIG. 7, an information recording medium in a second embodiment will be explained. FIG. 7 is a structure diagram showing the information recording medium in the second embodiment, which shall be consistent with the purport of FIG. 1 in the first embodiment. Incidentally, in FIG. 7, the same constituents as those shown in FIG. 1 will carry the same referential numerals, and the explanation thereof will be omitted.

In FIG. 7, an information recording medium 101 in the embodiment is provided with a reflective layer 41 and a heat transmittance change film 42 instead of the aforementioned heat reflectance change film 3, which is difference from the first embodiment.

As shown in FIG. 7, the information recording medium 101 in the embodiment is provided with a substrate 1, a recording layer 2, a reflective layer 41, a guide track 6, a color filter 4, a heat transmittance change film 42, and protective films 5, The reflective layer 41 is, e.g., an infrared semi-transmissive reflective film, and it is laminated on the protective layer 5 which is laminated on the recording layer 2. The reflective layer 41 reflects visible light (i.e. external light, natural light, or the like surrounding a viewer) which enters from the label side of the substrate 1 through the protective layer 5, the heat transmittance change film 42, the color filter 4, and the guide track 6.

The heat transmittance change film 42 is laminated on the color filter 4, and heat associated with the light irradiation of the drawing laser changes optical transmittance in each microdomain corresponding to the spot of the drawing laser. By this, the transmittance of the heat transmittance change film 42 is changed with a distribution according to the irradiation or non-irradiation of the drawing laser beam. As a result, in the heat transmittance change film 42, the amount of light reflected by the reflective layer 41 on the label surface side is increased in a portion in which the optical transmittance is high or becomes high, and the amount of light is reduced in a portion in which the optical transmittance is low or becomes low.

The guide track and the color filter 4 are disposed between the reflective layer 41 and the heat transmittance change film 42.

The label drawing is performed by making an optical transmittance change in the heat transmittance change film 42 by applying the drawing laser beam to the heat transmittance change film 42 while modulating the power of the drawing laser beam in accordance with a letter, a character, or an image to be drawn, with the tracking with respect to the guide track 6.

After the label drawing in the above manner, visible light (i.e. external light, natural light, or the like surrounding a viewer) is reflected by the reflective layer 41 through the heat transmittance change film 42, the color filter 4, and the guide track 6 and is emitted toward the viewer, by which a desired letter, character, or image which is label-drawn can be seen. Here, in particular, the label drawing allows the visible letter, character, or image to be formed on the label surface of the substrate 1, and the letter, character, or image is expressed in any color with the color cell as a pixel unit.

Next, a label drawing process using the information recording medium 101 in the second embodiment will be explained with reference to FIG. 5.

(Label Drawing Process in First Embodiment)

FIG. 5 is a flowchart showing the label drawing process of the information recording medium 101 in the second embodiment.

Specifically, in FIG. 5, as in the first embodiment, firstly, it is judged by the controller 9 whether or not there is the barcode 21 indicating the relative position information on the label surface of the information recording medium 100 (step S21). Here, if there is no barcode 21 (the step S21: No), the drawing laser beam according to the image to be drawn is applied, and the heat transmittance change film 42 is heated or not heated by a cell unit in accordance with the modulation of the drawing laser, by which a color image is drawn on the label surface (step S24).

On the other hand, if there is the barcode 21 (the step S21: Yes), the relative position information is read from the barcode 21 by the barcode reading sensor 10 (step S22). Then, the image to be drawn is data-processed on the basis of the relative position information by the data processing device 11

(step S23). If the drawing laser beam according to the data-processed image is applied, the heat transmittance change film 42 is heated or not heated by the cell unit in accordance with the modulation of the drawing laser, by which the color image is drawn on the label surface (the step S24).

As described above, according to the second embodiment, it is provided with the reflective layer 41, the heat transmittance change film 42, the color filter 4, and the guide track 6, and the positioning with respect to the color filter 4 is accurately performed on the basis of the address assigned to each of the color cells before the light irradiation by the drawing laser is performed by the color cell unit. By this, the accurate light irradiation by the pixel unit is performed to express colors, so that it is possible to perform the color drawing or the label drawing in color, highly accurately.

<Third Embodiment>

Figure 8:
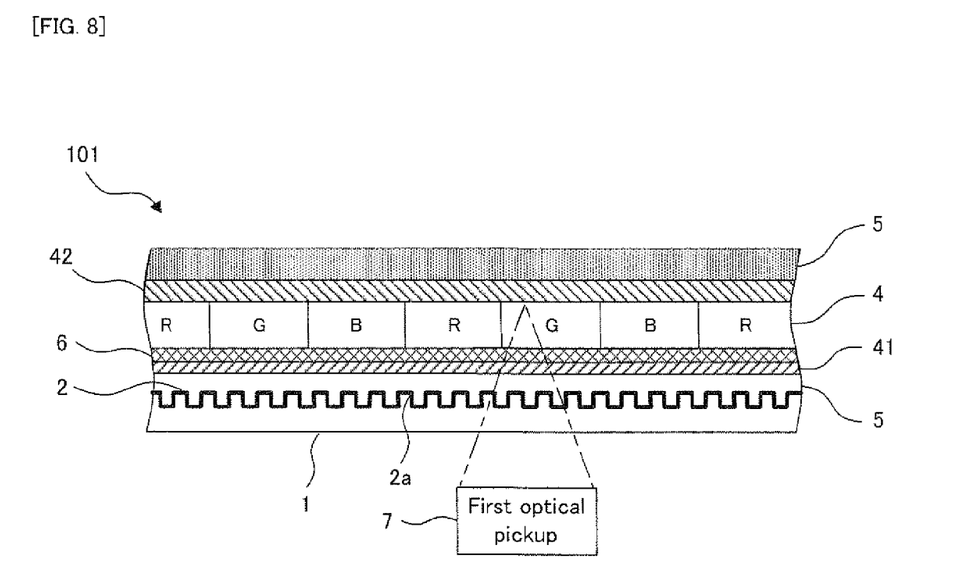
FIG. 8 is a schematic cross sectional view showing the light irradiation of a drawing laser with respect to a heat transmittance change film which is one constituent element of an information recording medium in a third embodiment.

Next, with reference to FIG. 8, an information recording medium in a third embodiment will be explained. FIG. 8 is a structure diagram showing the information recording medium in the third embodiment, which shall be consistent with the purport of FIG. 7 in the second embodiment. Incidentally, in FIG. 7, the same constituents as those shown in FIG. 7 will carry the same referential numerals, and the explanation thereof will be omitted.

In FIG. 8, in an information recording medium 101 in the embodiment, the light irradiation of the drawing laser with respect to the heat transmittance change film 42 is performed from the recording surface side of the substrate 1, which is different from the second embodiment.

The first optical pickup 7 is disposed on the recording surface side of the substrate 1. The first optical pickup 7 irradiates the drawing laser modulated in accordance with a letter, character, or image to be drawn, to the heat transmittance change film 42 from the recording surface side. By this, the transmittance of the heat transmittance change film 42 is changed with a distribution according to the irradiation or non-irradiation of the drawing laser beam.

Next, a label drawing process using the information recording medium 101 in the third embodiment will be explained with reference to FIG. 5.

(Label Drawing Process in First Embodiment)

FIG. 5 is a flowchart showing the label drawing process of the information recording medium 101 in the third embodiment.

Specifically, in FIG. 5, as in the first and second embodiments, firstly, it is judged by the controller 9 whether or not there is the barcode 21 indicating the relative position information on the label surface of the information recording medium 100 (step S21). If there is no barcode 21 (the step S21: No), the drawing laser beam according to the image to be drawn is applied from the recording surface side to the heat transmittance change film 42 through the substrate 1, the recording layer 2, the reflective layer 41, the guide track 6, and the color filter 4, and the heat transmittance change film 42 is heated or not heated by a cell unit in accordance with the modulation of the drawing laser, by which a color image is drawn on the label surface (step S24). On the other hand, if there is the barcode 21 (the step S21: Yes), the relative position information is read from the barcode 21 by the barcode reading sensor 10 (step S22). Then, the image to be drawn is data-processed on the basis of the relative position information by the data processing device 11 (step S23). If the drawing laser beam according to the data-processed image is applied from the recording surface side to the heat transmittance change film 42 through the substrate 1, the recording layer 2, the reflective layer 41, the guide track 6, and the color filter 4, then, the heat transmittance change film 42 is heated or not heated by the cell unit in accordance with the modulation of the drawing laser, by which the color image is drawn on the label surface (the step S24).

As described above, according to the third embodiment, whether the light irradiation is performed from the label surface side or from the recording surface side, the positioning with respect to the color filter 4 is accurately performed on the basis of the address assigned to each of the color cells before the light irradiation by the drawing laser is performed by the color cell unit. By this, the accurate light irradiation by the pixel unit is performed to express colors, so that it is possible to perform the color drawing or the label drawing in color, highly accurately. In particular, if the laser beam is used on a recording apparatus as both the laser for information recording and the laser for label drawing, the case of applying the laser for label drawing from the recording surface side is advantageous from the viewpoint of the apparatus structure of the recording apparatus, simple operations for control and drawing, or the like.

Incidentally, the reflective layer 41 is desirably provided with a wavelength-selective transmissive film which transmits only the drawing laser beam. By this, the drawing from the recording surface can be visually recognized only from the label surface.

Incidentally, the information recording medium 100 in the first embodiment can also adopt the same aspect as that of the first optical pickup in the third embodiment, as occasion demands.

The present invention is not limited to the aforementioned embodiments, but various changes may be made, if desired, without departing from the essence or spirit of the invention which can be read from the claims and the entire specification.

Industrial Applicability

The present invention can be applied to an information recording medium such as an optical disc like a DVD, a BD, or the like on which a label can be drawn on its surface by light irradiation, or a color drawing system or the like which performs color drawing or label drawing in color, on the information recording medium.

The invention claimed is:

1. An information recording medium comprising:
   a substrate;
   a recording layer which is laminated on said substrate and in which information can be recorded;
   a color filter which is laminated over said substrate;
   a heat transmittance change layer which is laminated over said substrate and in which optical transmittance can be changed by heat associated with light irradiation; and
   a reflective layer which is laminated over said substrate and which reflects visible light that enters from one surface side of said substrate through said heat transmittance change layer and said color filter.

2. The information recording medium according to claim 1, wherein
   said reflective layer, said color filter, and said heat transmittance change layer are laminated in this order on the one surface side of said substrate, and
   said information recording medium further comprises a protective film laminated on said heat transmittance change layer.

* * * * *